United States Patent

Durham

[11] 3,908,490
[45] Sept. 30, 1975

[54] HAND TOOL FOR MOUNTING TRUCK TIRES

[76] Inventor: Jerry L. Durham, 1175 W. 22nd, Eugene, Oreg. 97405

[22] Filed: Aug. 12, 1974

[21] Appl. No.: 496,866

[52] U.S. Cl. ............................ 81/420; 81/425 A
[51] Int. Cl.² .......................................... B25B 7/02
[58] Field of Search .......... 81/418, 420, 425 R, 426; 29/283

[56] References Cited
UNITED STATES PATENTS

| | | | |
|---|---|---|---|
| 2,752,812 | 7/1956 | Steine | 81/425 R |
| 2,803,320 | 8/1957 | Wagner | 81/426 UX |
| 3,202,023 | 8/1965 | Parker | 81/425 R |
| 3,617,044 | 11/1971 | Strange | 81/420 X |
| 3,842,696 | 10/1974 | Wayne | 81/425 R |

Primary Examiner—James L. Jones, Jr.
Attorney, Agent, or Firm—James D. Givnan, Jr.

[57] ABSTRACT

A hand tool for clamped attachment to a metal wheel rim during a tire mounting operation to retain a tire bead in place on the rim. Disclosed is a plier-like tool having a self-locking capability. Novel jaw components are configured to engage the irregular rim periphery in a secure manner with one of said jaw components additionally serving to bear against the tire sidewall and bead preventing same from slipping back over the wheel rim during a tire mounting operation.

3 Claims, 3 Drawing Figures

HAND TOOL FOR MOUNTING TRUCK TIRES

BACKGROUND OF THE INVENTION

The present invention relates generally to tire mounting equipment and more particularly to a hand tool for temporary attachment to a wheel during a tire mounting operation.

A problem exists in the mounting of large size tires on trucks and other heavy duty vehicles at locations remote from a tire shop. Under ideal shop conditions, tires are mounted with the use of costly mechanized equipment including powered devices greatly facilitating the mounting operation. An entirely different situation exists in the mounting of tires on vehicles in the field, as is often done as it is impractical to tie up vehicle and driver by taking same to a tire shop for the necessary tire replacement. Commonly, owners of trucks will simply request tire mounting be accomplished at their premises which often are unequipped with mechanized tire changing equipment. In such instances, tire mounting is performed manually by a workman equipped with only a number of tire irons. In the well-known manner, a plurality of tire irons are sequentially inserted below the wheel rim with subsequent rocking of the tire iron causing the tire bead to progressively slip beneath the wheel rim. It is common practice to use three or more tire irons to properly seat a tire bead about a wheel rim with the workman standing on one or more of the inserted tire irons to assure continued bead-rim engagement while mounting is completed. As the tire bead undergoes tensioning during tire mounting there is a substantial upward force exerted on the tire iron which is resisted by placement of a worker's foot on the iron or being manually held by an assistant. Accidental release of a tire iron during final stages of a mounting operation will result in forceful upward movement of the iron and in some instances injury to the workman. It is not an uncommon practice for a workman to stand with each foot on an inserted tire iron while using a third tire iron to pry the remaining unseated bead of the tire below the wheel rim which effort requires considerable strength and dexterity.

SUMMARY OF THE INVENTION

The present hand tool embodying the invention includes jaws for temporary gripping engagement at points about the metal wheel rim with one of said jaws additionally serving to confine the tire bead and adjacent tire sidewall beneath the wheel rim.

Jaw plates of the present tool are shaped at their forward ends to firmly grip the metal wheel rim and remain locked in place thereon until released by the workman. The opposing jaw surfaces are configured for purposes of assuring positive attachment to the wheel rim. A jaw component is curved to exert an inward, confining force against the tire sidewall and bead. For purposes of conveniently mounting the jaws to a wheel rim, the jaws are integral with a plier-like tool having means for holding the jaws in clamped engagement with the wheel rim.

Important objectives of the present invention include: the provision of a hand tool for use in the field by tire repairmen who must accomplish tire mounting without the aid of mechanized shop equipment; the provision of a hand tool functioning somewhat in the nature of a tire iron to retain the tire bead subjacent the wheel rim during tire mounting but not requiring the continued application of manual force during a mounting operation as is the case with a conventional tire iron; the provision of a hand tool for use in tire mounting operations obviating the risks attendant the use of conventional tire irons which may be injurious to the worker in instances where the tire iron is inadvertently released.

DETAILED DESCRIPTION OF THE PREFERRED EMBODIMENT

Figure 1:
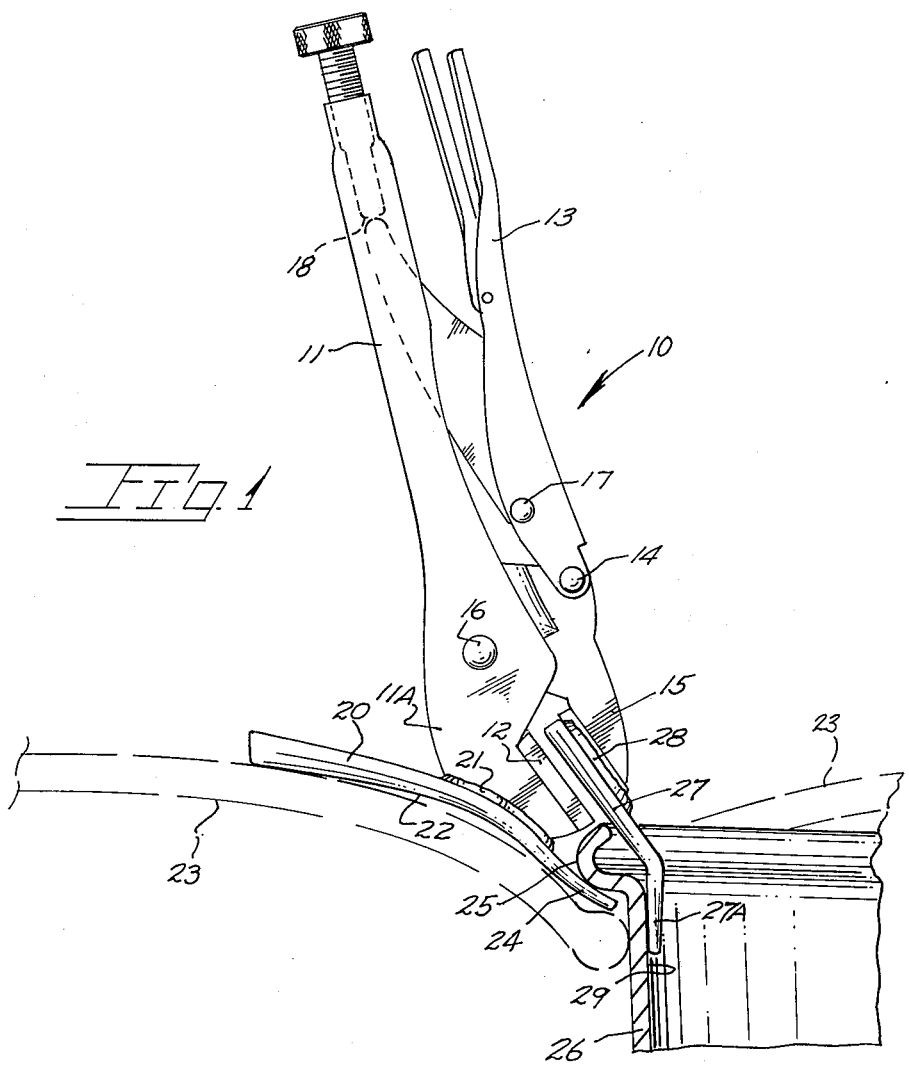
FIG. 1 is an elevational view of the hand tool embodying the present invention in place on a horizontally disposed wheel rim to which a tire is being applied.
Figure 2:
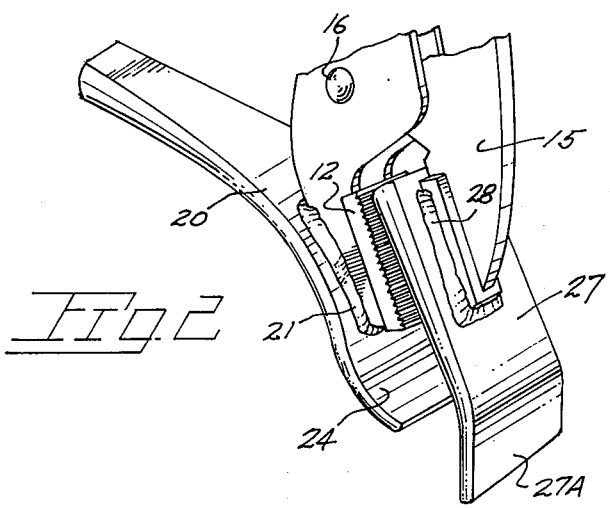
FIG. 2 is a perspective view of the novel jaw components of the present tool.

With continuing reference to the accompanying drawing wherein applied reference numerals indicate parts similarly identified in the following specification, the reference numeral 10 indicates generally a plier-like tool manufactured and sold under the registered trademark VISE-GRIP. Said tool is very well-known and includes a main grip portion 11 terminating in a head 11A having a primary jaw 12 while a lever portion 13 terminates in pivoted attachment at 14 with a secondary jaw 15 pivotally connected at 16 to the head 11A of the tool. The tool includes locking means which utilizes an over-center locking principle wherein a pivot 17 is moved past center between pivot 14 and an adjustable stop indicated at 18 to retain tool jaws in clamped engagement with a workpiece. The following described jaw components are not limited to combination with the above described tool, such a tool however does provide one highly practical embodiment.

With attention now to the novel jaw structure in combination with the above described plier-like arrangement, a first jaw component or plate at 20 is in welded securement at 21 to head 11A of the tool. Said first jaw component includes a slightly concave jaw surface 22 for retentive placement against the sidewall of a tire shown at 23 in phantom lines. A forward lip 24 of jaw plate 20 is of reverse curvature specifically adapted for engagement with the irregular outer periphery or rim 25 of an automotive wheel 26.

A cooperating jaw component or plate 27 is similarly secured by a weld 28 to the remaining jaw of the hand tool. Said cooperating jaw is of an angular nature having an outer segment 27A inclined forwardly toward first jaw 20 and adapted for clamped surfacial engagement with an inner peripheral wall surface 29 of the metal wheel 26.

Figure 3:
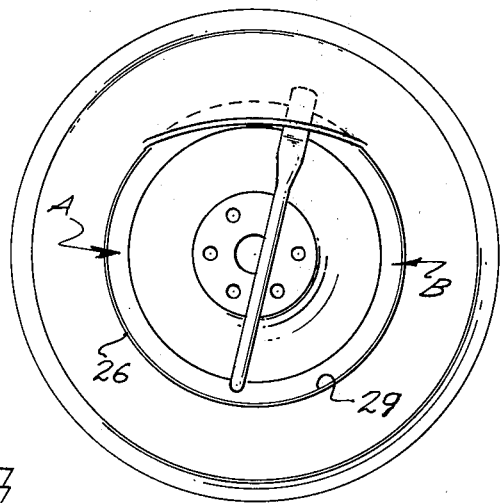
FIG. 3 is a top plan view of a wheel rim and partially mounted tire during a mounting operation.

With reference to FIG. 3, the use of the tool entails the clamped application of two or more of the present tools to the wheel rim at circumferentially spaced locations such as at A and B. Initially a conventional tire iron is used to engage the tire bead with the underside of the wheel rim with such engagement in initial mounting stages being in a loose manner. A first tool embodying the present invention is then clamped in place on the wheel rim preparatory to reinsertion of the tire iron under a circumferentially spaced portion of the tire. Subsequent outward rocking of the tire iron in the normal manner will result in the tire bead passing below the wheel rim whereupon a second hand tool is applied to the wheel rim 26. With the two tools in place as shown, the workman may direct his entire effort to prying the remaining tire bead segment into engagement with the wheel rim without concern about the previously engaged bead slipping back over the wheel edge. The heretofore practice of standing on inserted tire irons to assure continued bead-wheel engagement is accordingly obviated greatly lessening the effort required for tire mounting and more importantly avoiding the risk of an inadvertently released tire iron injuring the worker.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. In combination with a plier-type tool having opposing jaws and locking means for retaining the jaws in clamped relationship, the improvement providing a tool temporarily attached to a vehicle wheel during the mounting of a tire to assure retention of the tire bead with the wheel rim during the tire mounting operation, the improvement comprising, a first jaw plate secured to a jaw component of the tool in an inclined relationship to the tool centerline and having an outwardly disposed surface for restraining abutment with a tire sidewall, said jaw plate having a forwardly projecting lip segment the inner side of which being engageable with the wheel intermediate the wheel rim and the tire bead, a second jaw plate carried by the remaining jaw component of the hand tool and terminating outwardly in an inclined segment forwardly spaced from the lip segment of said first jaw plate and thereat adapted for surfacial clamped engagement with the wheel, and said first and second jaw plates cooperating when clamped to the wheel to position said outwardly disposed surface of the first jaw so as to confine the tire sidewall and adjacent tire bead against separation from the wheel rim during tire mounting.

2. The hand tool as claimed in claim 1 wherein said first jaw plate is of curved configuration with said outer jaw surface area thereon being concave.

3. The hand tool as claimed in claim 1 wherein said forward end of the first jaw plate is of reverse configuration with respect to the remaining curved portion of the jaw plate.

* * * * *